Oct. 31, 1939.  R. H. MADDOCK  2,177,991
AUTOMOBILE FRAME AND STRUCTURAL MEMBER
Filed April 1, 1938   3 Sheets-Sheet 1
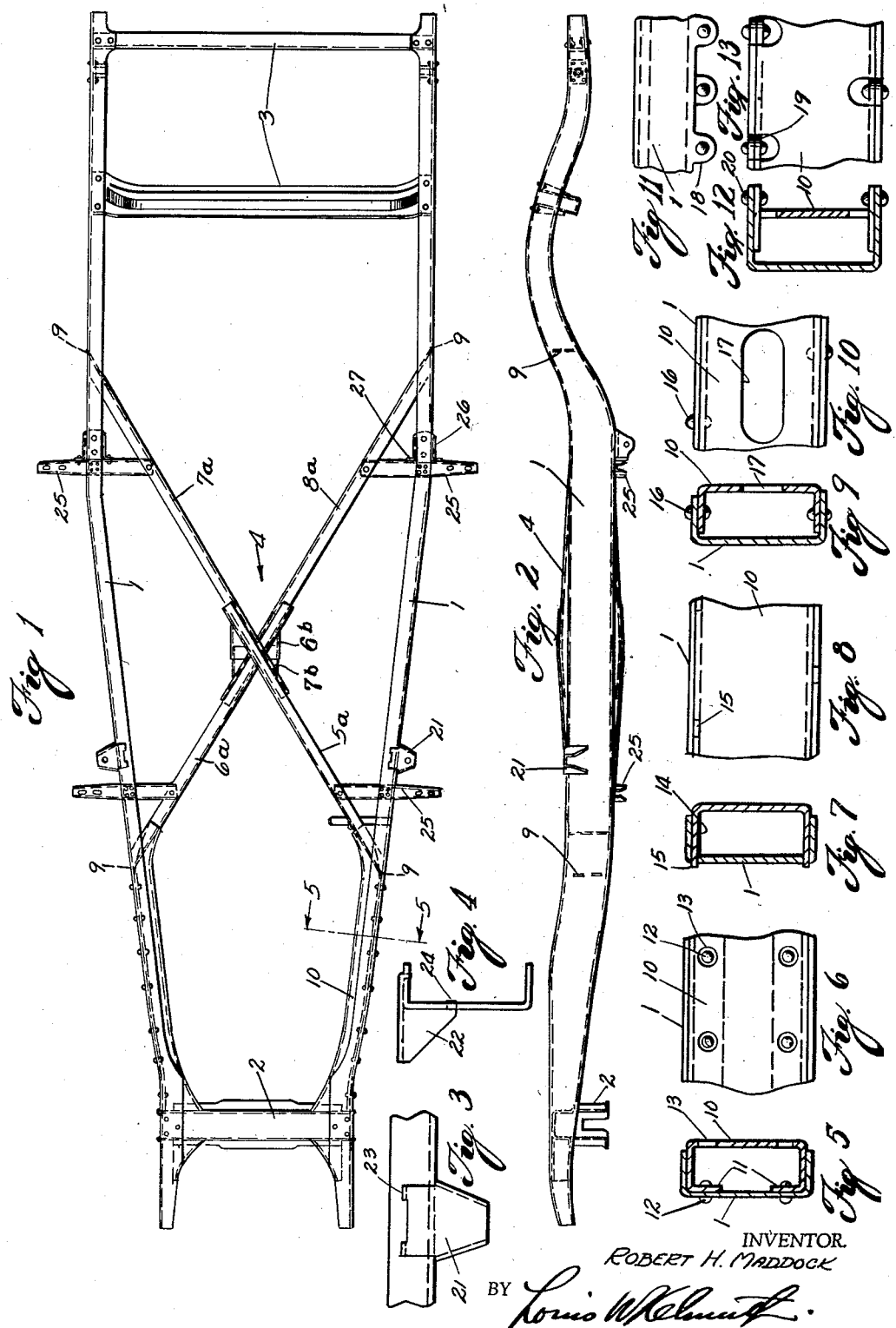
INVENTOR.
ROBERT H. MADDOCK
BY
ATTORNEY.

Oct. 31, 1939.　　　R. H. MADDOCK　　　2,177,991
AUTOMOBILE FRAME AND STRUCTURAL MEMBER
Filed April 1, 1938　　　3 Sheets-Sheet 2
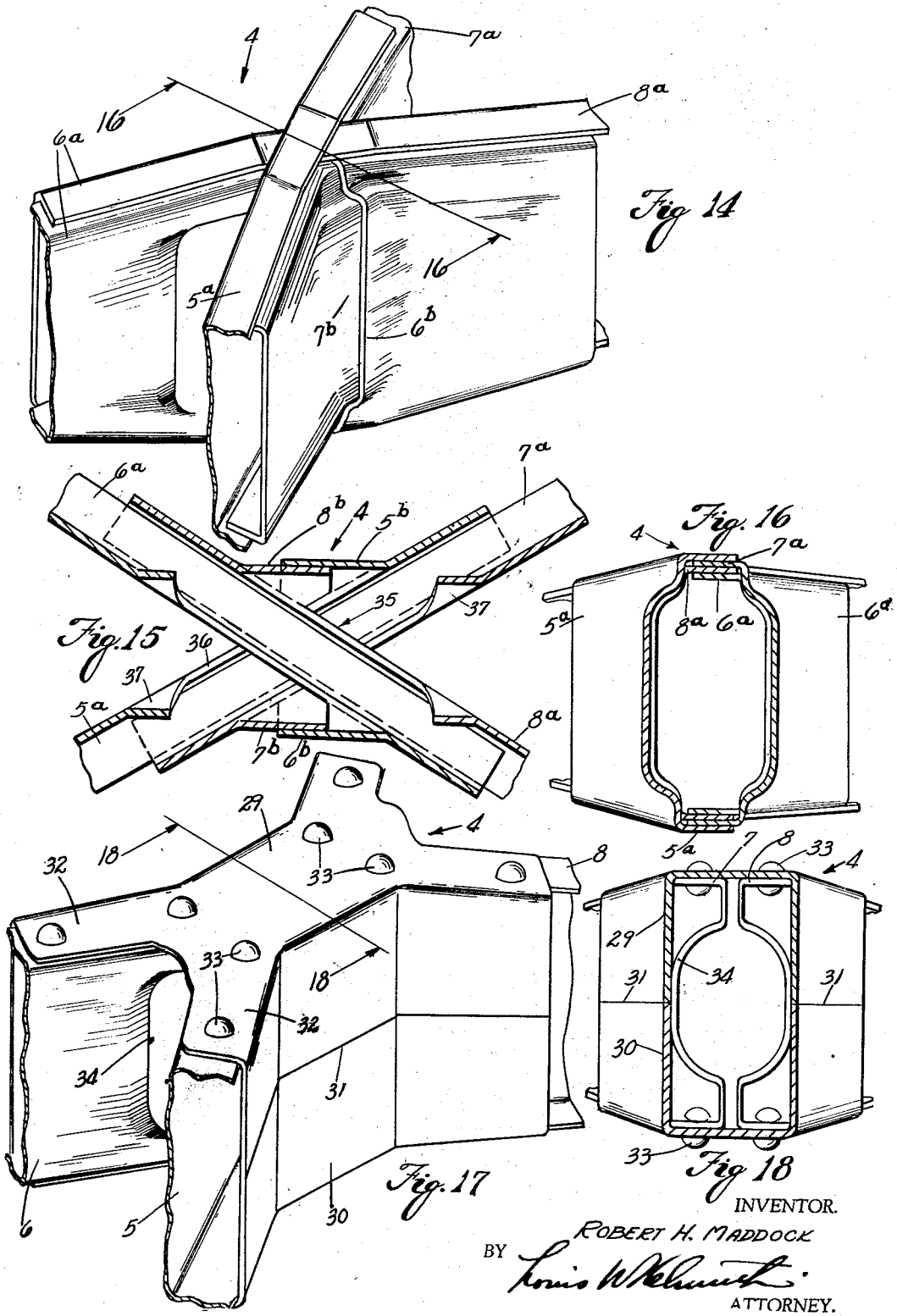
INVENTOR.
ROBERT H. MADDOCK
BY
ATTORNEY.

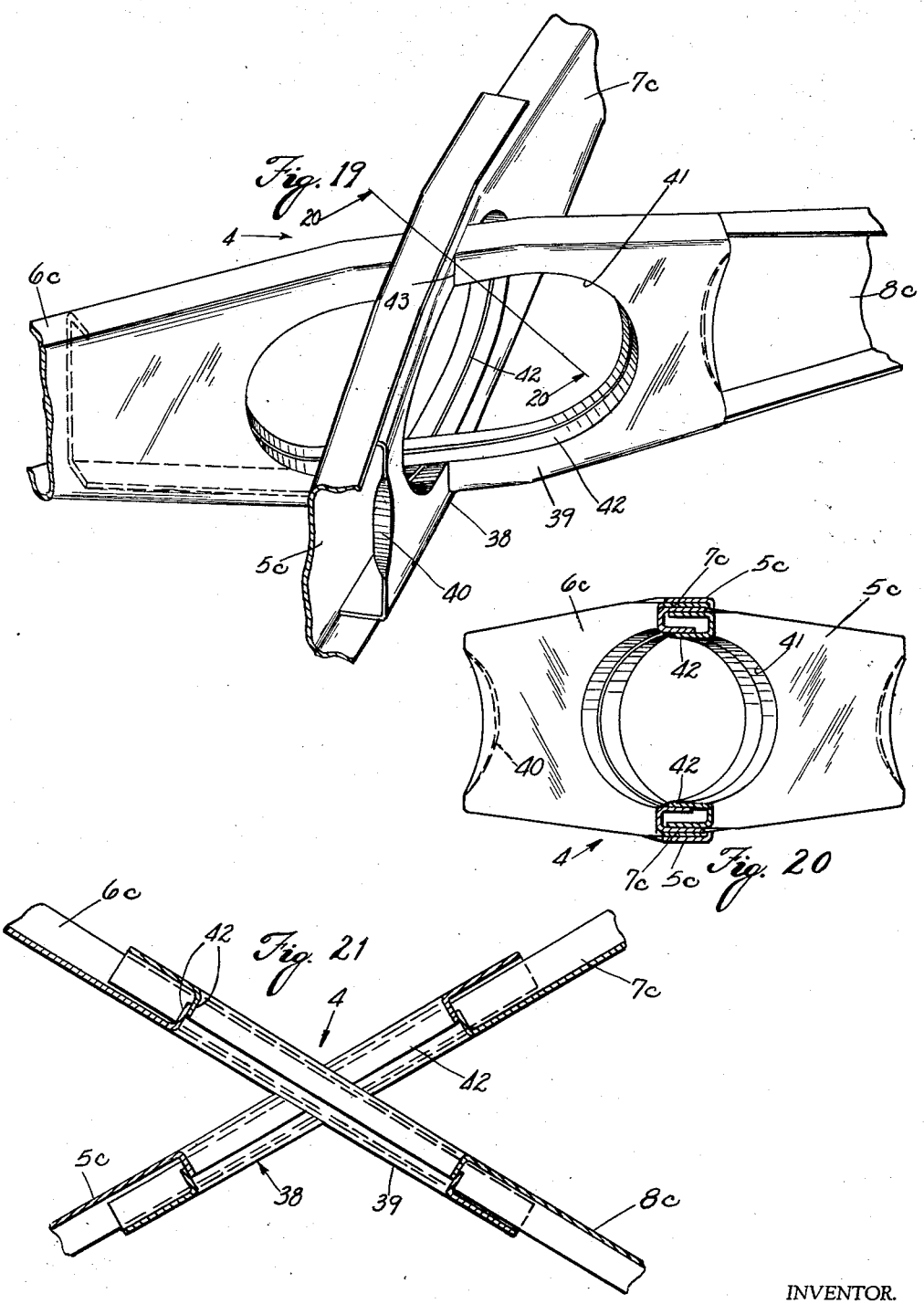

Patented Oct. 31, 1939

2,177,991

UNITED STATES PATENT OFFICE 2,177,991

AUTOMOBILE FRAME AND STRUCTURAL MEMBER

Robert H. Maddock, Lakewood, Ohio, assignor to The Midland Steel Products Company, Cleveland, Ohio, a corporation of Ohio Application April 1, 1938, Serial No. 199,468

7 Claims. (Cl. 280—106)

This invention relates to new and useful improvements in automobile frames and structural members.

An important object of the invention is to generally improve frame construction in rigidity and weight and also to simplify the construction of the X-shaped cross member, at the same time affording a much stronger member than has been used heretofore and which can be economically manufactured.

The present X-shaped cross members used in automobile frames, are provided with propeller shaft clearance usually in the form of a central opening through the member, which weakens it to some degree and the preferred embodiment of this invention employs a closed hollow section both above and below the intersection to increase its strength at this point.

Another object is to provide various braced constructions for the intersection of the arms of X-shaped members which are formed primarily into hollow section by the arms of the member itself to reduce weight and increase rigidity.

A further object is to employ certain parts of the automobile frame to replace separate fastenings for connecting various adjuncts thereto.

Other objects and advantages of the invention will become apparent during the course of the following description.

In the accompanying drawings forming a part of the description and wherein like numerals are employed to designate like parts throughout the several views, Fig. 1 is a sub-plan of an automobile frame embodying the improved construction, Fig. 2 is a side elevation of the same, Fig. 3 is an enlarged fragmentary plan of an improved form of body bracket applied to the side rails, Fig. 4 is a side elevation of the same, Figs. 5, 7, 9 and 12 inclusive are transverse sections of the same taken on the line 5—5 showing various means for connecting complementary parts of the frame, and Figures 6, 8, 10, 11 and 13 are elevations of the same, Fig. 14 is an enlarged perspective fragmentary view of one form of X-shaped cross member employed in the same, Fig. 15 is a horizontal section of the same, Fig. 16 is a vertical transverse section taken on the line 16—16 of Fig. 14, Fig. 17 is an enlarged fragmentary perspective view of another form of the X-shaped cross member, Fig. 18 is a vertical transverse section of the same taken on the lines 18—18 of Fig. 17, Fig. 19 is an enlarged perspective fragmentary view of another form of the X-shaped cross member, Fig. 20 is a transverse vertical section through the same taken on the line 20—20 of Fig. 19, Fig. 21 is a horizontal section of the X-shaped cross member shown in Fig. 19.

Referring now more specifically to the drawings, the numeral 1 designates a pair of longitudinally extending side rails of inwardly opening channel shaped section connected at their forward ends by forward cross member 2, and at their rear ends by suitable cross members 3. These side rails are connected at points intermediate their ends by an X-shaped cross member 4 located at approximately the center of the frame. All four arms 5ª, 6ª, 7ª and 8ª of the X-shaped member are of channel-shaped cross section and are connected to their respective side rails by extending into the channels thereof and having their webs provided with a pair of spaced longitudinal projections or keys 9 adapted to extend through apertures in the webs of the side rails to be fused or welded to the edges of these apertures.

The portions of the side rails between the forward cross member 2 and the forward ends of the X-shaped cross member are formed into hollow box section in various ways as shown in Figs. 5 to 13 inclusive. This is accomplished primarily by a channel-shaped sub-rail 10 arranged with its channel facing that of the side rails and having its forward ends secured to the forward cross member 2 and its rear end curved inwardly to overlap and be secured to the forward arm of the X-shaped cross member. In the form shown in Figs. 5 and 6, the ends of the flanges of the sub-rails are turned inwardly toward one another at 11 to be riveted to the web of the side rail by means of the rivets 12. The web of the sub-rail is provided with apertures 13 directly opposite the rivets for the insertion of a suitable riveting tool for heading the rivets inside of the closed box section. The sub-rail 10 in Figs. 7 and 8 has its flanges 14 provided at spaced intervals with welding projections 15 which extend through staggered apertures in the web of the side rail for welding directly thereto. In Figs. 9 and 10, the sub-rail 10 has the usual channel flanges nested within those of the side rail 1 and riveted thereto as at 16. In this instance, the web of the sub-rail is provided with an enlarged elongated aperture 17 at its neutral axis to facilitate the insertion of a suitable riveting tool inside of the hollow rail. In Figs. 11 to 13 inclusive, the flanges of the side rail are provided at spaced intervals with staggered apertured lugs 18 to cooperate with similar lugs 19 pressed out of the web of the sub-rail 10 and extending in the same plane with the flanges of the sub-rail for registration with the lugs 18 whereby rivets 20 may be set in these registering lugs to fasten the sub-rail to the main rail.

A very simple and inexpensive body bracket for fastening the body to the frame is illustrated in Figs. 3 and 4 and comprises a flat metal plate 21 having a pair of side wings 22 struck down therefrom. The inner edges of the plate 21 is provided with angular claw-like projections 23 which are adapted to hook into apertures in the upper flange of the side rail and cause the bracket to swing downwardly until welding projections 24 on the inner edges of the wings 22 pass through apertures in the web of the side rail. A welding torch can then be applied inside of the channel of the rails to melt down the projections 23 and 24 and weld them to the side rails. Any number of these body brackets may be employed in fastening the body to the frame.

Step hangers 25 in the form of channel-shaped strips are located to bridge the crotch between the side rails and the X-member arms and are fastened thereto so that their outer ends extend outwardly for the attachment of the usual running board. Directly behind the rear step hangers are located inverted U-shaped spring hangers 26 which are secured to the bottom flange of the side rail and have lateral projections 27 which are suitably fastened to the sides of the rear step hangers 25.

The X-shaped member 4 shown in Figs. 17 and 18 is composed of the four channel-shaped arms 5, 6, 7 and 8 and a pair of U-shaped stampings 29 and 30 which are flash welded in edge to edge relation along the lines 31. Each stamping is provided with four L-shaped angular extensions 32 which are secured to the flanges of the X-member arms by means of the rivets 33. It will be noted that the four arms of the X-member have their channels facing the channels formed by two complementary angular extensions of the stampings 30 and 29 to form hollow box-like sections, which form the intersection into a closed box section structure with diagonally arranged arms in longitudinal alignment. The web of each X-member arm adjacent the intersection is provided with an opening 34, the edges of which are flanged to provide the inter-section of the X-member with propeller shaft clearance. In all embodiments of the X-members are shown, the inner ends of the arms 5, 6, 7 and 8 are vertically enlarged where they form the intersection as best appreciated from Fig. 2, to form a cord like beam.

In Figs. 14, 15 and 16, no separate stampings or gusset plates are employed in the formation of the intersection and each pair of diagonally disposed or aligned arms such as 5ª and 7ª or 6ª and 8ª have their inner ends vertically enlarged and arranged in overlapping, nested relation with the channels thereof facing each other to form such ends into hollow box-like intersection members. In other words, each pair of diagonally disposed arms, in effect, constitutes one arm, so that the X-shaped member may be said to be composed of a pair of intersecting arms which cross each other in cruciform relation. Thus, referring specifically to Fig. 14, it will be clear that the X-member may be said to comprise a pair of intersecting arms, each having a hollow closed medial portion of vertically enlarged dimensions, one of such arms being of slightly greater depth than the other for extension of the other arm therethrough in forming the inter-section. The hollow box formation member of the arms 5ª and 7ª is provided with an opening 35 of a shape to snugly receive the medial box formation portion of the arms 6ª and 8ª for welding to the edges thereof. The web of each of the arms 5ª, 6ª, 7ª and 8ª is provided with a laterally embossed web portion designated by a numeral corresponding to its respective arm with a small letter b added. Thus, the web portion 6ᵇ overlaps the web portion 7ᵇ and the web portion 5ᵇ overlaps the web portion 8ᵇ of the arm 8ª. This additionally opens up the web for the extension of one member through the other, and to further open the web portions, the web of each arm is provided with an opening 36 having the edges 37 thereof remote from the intersection deflected inwardly of its respective channel to provide the X-shaped member with propeller shaft clearance. The web portions 5ᵇ, 6ᵇ, 7ᵇ and 8ᵇ are all welded or otherwise suitably secured together in overlapping relationship shown in Fig. 15 to integrate the arms of the X-shaped member and to form a very rigid and torsionally stiff member. As seen in Fig. 16, the flanges of the arm 8ª are overlapped by the flanges of arm 5ª and may be suitably secured together with rivets, welding or other suitable fastenings.

The preferred form of X-shaped member shown in Figs. 19 to 21, provides an opening through the intersection member bounded all around with a closed box-shaped section, and in effect provides the X-shaped member with four upper hollow closed section arms and four lower hollow closed section arms. In this instance, the X-member is also composed of the four separate arms 5ᶜ, 6ᶜ, 7ᶜ and 8ᶜ which are arranged so that the aligned arms are nested in opposed relationship to form the intersection with a closed box-like formation designated by the numeral 38 for the arms 5ᶜ and 7ᶜ and the numeral 39 formed by the arms 6ᶜ and 8ᶜ. The free edge of the web of each section is turned inwardly toward the web of the cooperating arm as at 40 for strengthening purposes. These box formation members of the arms have their medial portions vertically enlarged in cord-like form, as in the preceding modification, and also are each provided with an enlarged opening 41 formed by pressing an opening in the web of each arm and providing the margin of the opening with an inwardly extending flange 42 which is welded in overlapping relation to the corresponding flange of the complementary channel. This forms a complete box section for all four arms defining the opening through the intersection, and, as will be appreciated, provide a completely closed tubular section above and below the opening in the inter-section. The webs of the arms 5ᶜ and 7ᶜ are provided with registering notches 43 through which the box-like member 39 of the other complementary arm extends to form the cruciform member. At all points of contact between the box formation members, they are welded or otherwise suitably fastened together to form a highly rigid and exceptionally light form of X-shaped member. It will be appreciated, of course, that the enlarged openings 41 in the box formation members provide sufficient propeller shaft clearance when used for automobile frames, but it is to be understood that I do not desire to limit these X-shaped members to their use in such frames.

It is to be understood that various changes in the size, shape and arrangement of parts may be resorted to without departing from the spirit of the invention or the scope of the appended claims.

I claim:

1. An X-shaped member comprising a hollow member extending through a second hollow member and forming four upper hollow closed-section arms and four lower hollow closed-section arms.

2. An X-shaped member comprising two intersecting members having four upper hollow closed-section arms and four lower hollow closed-section arms, said upper arms merging into the corresponding lower arms to form the two intersecting members into hollow sections at opposite sides of the intersection.

3. An X-shaped member having an intersection composed of a pair of hollow closed section intersecting arms crossing each other and spaced from another similar pair of hollow closed section arms, and each pair of hollow closed section arms defining an X-shaped structure integrated with the other X-shaped structure at points beyond the intersection.

4. A structural member of substantially X-shape comprising a pair of hollow arms with vertically enlarged medial portions, each arm having an opening in its medial portion with the edges of the openings in opposite sides of the arm turned toward each other and secured together to bound the opening with closed hollow sections, one arm having its medial portion extended through the opening in the other arm and secured thereto to form a substantially X-shaped member having eight hollow arm portions defining a double X-shaped structure.

5. An X-shaped member composed of a pair of intersecting arms, each of which has an intermediate portion formed into a vertically enlarged hollow section having an opening bounded entirely by inwardly extending abutting flanges forming hollow closed-sections completely surrounding said opening, opposite edges of one of said openings being notched, and one of said arms having its enlarged hollow section extending through said notched portion of the other arm and secured thereto.

6. A structural member comprising a pair of hollow arms crossing each other to form a substantially X-shaped member having an intersection, one of said arms at the intersection having an opening, the other arm extending through said opening and having an opening therein at its intersecting portion, and the portions of said arms defining the openings and intersecting portions being of closed hollow section above and below the center of the intersection and entirely across the same.

7. A cross bracing structure for a chassis frame comprising a pair of intersecting struts, each of said struts comprising two channel members disposed in longitudinal alignment with their adjacent ends arranged with their channels facing one another and secured together to form a box section at the intersection, the box section of one strut having a passage therethrough receiving the box section of the other strut, each strut having registering openings in spaced walls at the intersection, and the margin of one opening in each strut being extended toward the margin of the registering opening in the same strut and secured together entirely around the opening.

ROBERT H. MADDOCK.